O. B. LATHAM.

Packer for Oil-Wells.

No. 8,574. Reissued Feb. 11, 1879.

Witnesses.
J K Smith
L. C. Fitler.

Inventor.
Obadiah B. Latham
by Bakewell & Kerr
Attorneys

N. PETERS, PHOTO-LITHOGRAPHER, WASHINGTON, D. C.

UNITED STATES PATENT OFFICE.

OBADIAH B. LATHAM, OF SENECA FALLS, NEW YORK.

IMPROVEMENT IN PACKERS FOR OIL-WELLS.

Specification forming part of Letters Patent No. 56,234, dated July 10, 1866; Reissue No. 8,574, dated February 11, 1879; application filed January 9, 1879.

DIVISION B.

*To all whom it may concern:*

Be it known that I, OBADIAH B. LATHAM, of Seneca Falls, in the county of Seneca and State of New York, have invented a new and useful Improvement in Packers for Oil-Wells; and I do hereby declare the following to be a full, clear, and exact description thereof, reference being had to the accompanying drawings, making part of this specification, in which—

Figure 1:
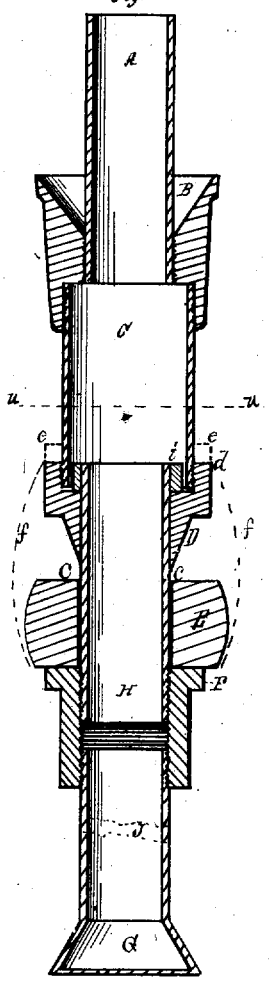
Figure 3:
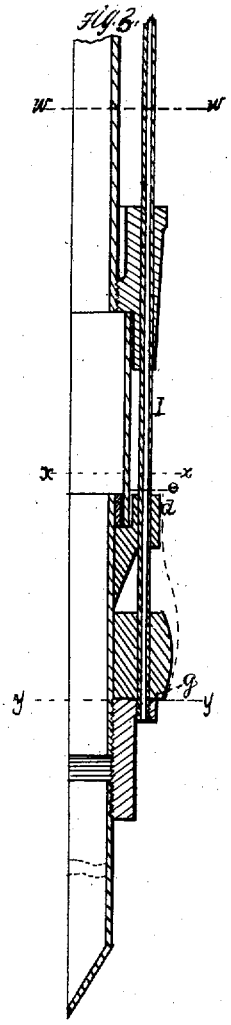
Figure 4:
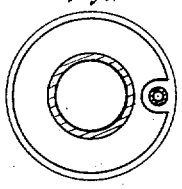
Figure 2:
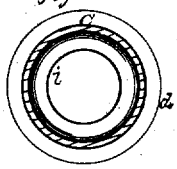
Figure 5:
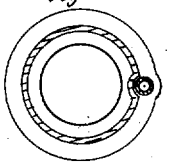
Figure 6:
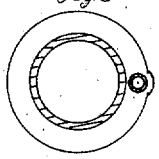

Figure 1 is a vertical section. Fig. 2 is a transverse section through the line *u u*, Fig. 1. Fig. 3 is a vertical section through the line *v v*, Fig. 4. Fig. 4 is a transverse section through line *w w*, Fig. 3. Fig. 5 is a transverse section through line *x x*, Fig. 3; and Fig. 6 is a transverse section through line *y y*, Fig. 3.

In order that persons skilled in the art may be enabled to construct and operate my machine, I will proceed to describe it.

Like letters in different figures refer to like parts.

This invention consists in certain devices, hereinafter fully described, for the purpose of preventing water or other substance from passing below or above any required point in an oil or water well, and also for the purpose of preventing the apparatus from getting fast in the well from an accumulation of débris above it.

A is the main pump-tube, running from the top of the well down to the funnel-shaped socket B, into which it is screwed. The use of the funnel-shaped socket, which is of a diameter at its upper edge a little less than that of the well, is to check débris in its downward progress. It is screwed upon the hollow cylinder C, which is slightly elliptical in form, for a purpose hereinafter described. Said cylinder is screwed within the flange *d* of the hollow truncated cone D, the lower edge of which is made blunt, so as to form a shoulder, for the purpose of preventing the elastic packing E from sliding upon the cone while the apparatus is being lowered into the well.

Inside of the cylinder C, and securely fastened to the top of the pump-tube H, is a collar, *i*, which moves freely in the cylinder. At the lower end of tube H is the anchor J, terminating with chisel-edge G, resting upon the bottom of the well. The chisel G sustains the whole apparatus, and prevents any rotation of the tube H, and likewise of the cylinder C, by means of the elliptical shape of said cylinder and of the collar *i*.

E is the packing, consisting of a solid annulus of gutta-percha or other elastic or flexible material, of a diameter a little less than that of the well, so that it may be raised or lowered therein freely and mounted on the tube H. When in use the annulus is forced tightly against the circumference of the well by the weight of the tubing pressing on the hollow truncated cone D, which is thereby driven down upon and into the packing-ring. As soon as the passage of water past the packing is stopped in this way, and a vacuum created beneath, the pressure of the superincumbent water is exerted upon the packing, together with that of the atmosphere above the annulus. It will be seen that by this arrangement the power exerted to expand the packing is always proportionate to and greater than the resistance to be overcome.

F is a flange screwed upon the tube H, for the purpose of sustaining the packing under pressure. Whenever it is desired to change the location of the apparatus, if the mass of débris resting upon the funnel-shaped socket B impedes the operation, it is only necessary to remove the pumping apparatus from within the tubes A and H, unscrew the tube A from the cylinder C, (which is prevented from becoming itself unscrewed during the operation by the immobility secured to it through its elliptical shape from the chisel G,) and raise the tube to a sufficient height to allow the débris to fall into the cylinder C and tube H through the funnel-shaped socket B. The tube A may then be lowered till it strikes the funnel-shaped socket, which cannot fail to guide it to its proper orifice, into which it is to be again screwed. The truncated cone D is then to be lifted up from its position between the tube H and the annulus E, when the latter will resume its original dimensions. The whole apparatus is then to be raised to the surface, the inclosed débris emptied out, and the apparatus lowered again to any position desired. The pump-cylinder (not shown in the drawings) is situated between the chisel G and the end of the pump tube H, and is not subject to change of position. Whenever it is desired to increase or diminish the distance between the annulus and the chisel, lengths of pipe are to be added to or taken from the tube H. The packer can be located and worked to perfection at any depth.

I is a pipe sometimes made use of, running through holes drilled in the funnel-shaped socket B, flange *d*, annulus E, and flange F, in which latter it is made fast, while the funnel-shaped socket and flange *d* work freely upon it. This pipe is intended as a means of egress for gas confined below the annulus, or of ingress for air from above the shut-off forced down by atmospheric or other pressure, to promote the flow of oil into the pump-cylinder.

It will be seen from an inspection of Fig. 5 that when the pipe I is used a depression is made in the cylinder C to accommodate said pipe. A corresponding depression being made in the band *i*, the necessity of the cylinder and band being made elliptical is avoided. *e* is a flange screwed upon the cylinder, C, and griping, in conjunction with the flange *d*, the upper edge of a sac, *f*, consisting of leather, bladder, or other suitable material, the lower edge of which is griped between the flanges F and *g*, screwed upon the cylinder H for the purpose.

The sac *f* is made water-tight, and when in use is filled with water. It subserves the double purpose of a packing and protection to the annulus E from the destructive action of oil, as no oil can penetrate to the annulus from the outside, and whatever leaks into the sac from the inside floats upon the surface of the water above the annulus. It is only to be used for this purpose when the annulus is located at an oil-yielding stratum. It is to be used as a packing when it is desired to locate the annulus in mud or at a point where the walls of the well are considerably irregular. It possesses peculiar advantages for this purpose. Its diameter can be increased suddenly by the pressure before spoken of, which operates it to any extent required, and it forms an immovable packing as long as the pressure continues. When it is required to change the location of or withdraw the apparatus, it is easily and quickly elongated, and thus gotten out of the way by the upward pull.

It is to be used or not, either in combination or not in combination with the annulus, as occasion may require.

What I claim as new, and desire to secure by Letters Patent, is—

1. The cylinder C and band *i*, varying from a true circle and arranged in relation to the cylinder H, and an external packing device, substantially as and for the purpose described.

2. The sac *f*, when used in combination with the parts H, F, G, E, D, and *d*, as and for the purpose set forth.

In witness whereof I, the said OBADIAH B. LATHAM, have hereunto set my hand.

OBADIAH BAILEY LATHAM.

Witnesses:
J. A. MALONEY,
CHARLES P. WEBSTER.